US011363097B2

(12) United States Patent
Desai et al.

(10) Patent No.: US 11,363,097 B2
(45) Date of Patent: Jun. 14, 2022

(54) METHOD AND SYSTEM FOR DYNAMICALLY REBALANCING CLIENT SESSIONS WITHIN A CLUSTER OF SERVERS CONNECTED TO A NETWORK

(71) Applicant: INTERNATIONAL BUSINESS MACHINES CORPORATION, Armonk, NY (US)

(72) Inventors: Aditya A. Desai, Morrisville, NC (US); Brian K. Martin, Cary, NC (US); Jason R. McGee, Apex, NC (US); Gabriel G. Montero, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 716 days.

(21) Appl. No.: 15/827,348

(22) Filed: Nov. 30, 2017

(65) Prior Publication Data
US 2018/0084041 A1    Mar. 22, 2018

Related U.S. Application Data

(63) Continuation of application No. 14/531,436, filed on Nov. 3, 2014, now Pat. No. 9,917,890, which is a
(Continued)

(51) Int. Cl.
*H04L 67/1027* (2022.01)
*H04L 9/40* (2022.01)

(52) U.S. Cl.
CPC .......... *H04L 67/1027* (2013.01); *H04L 29/06* (2013.01)

(58) Field of Classification Search
CPC ............................ H04L 67/1027; H04L 29/06
(Continued)

(56) References Cited

U.S. PATENT DOCUMENTS 5,774,668 A * 6/1998 Choquier ............... G06F 9/505
                                                              370/480
5,951,694 A   9/1999 Choquier et al.
(Continued)

FOREIGN PATENT DOCUMENTS

JP    2003271477 A    9/2003
WO    2005017750 A2   2/2005

OTHER PUBLICATIONS

Masutti, Oliver, "Distributed Web Session Management", Master Thesis in Computer Science, University of Zurich, Oct. 4, 2000.
(Continued)

*Primary Examiner* — Kevin S Mai
(74) *Attorney, Agent, or Firm* — Christopher Pignato; Andrew M. Calderon; Roberts Calderon Safran & Cole, P.C.

(57) ABSTRACT

A dynamic rebalancer operates in a server cluster independently of routers directing traffic to the servers in the cluster. An analysis component uses configuration information and statistics information to determine which session, if any, should be moved. A filter component receives transfer instructions from the analysis component. When the filter component receives transfer instructions from the analysis component, the filter component adds a redirect command to the client request. The filter component continually redirects client requests within the session to the new server until the client receives the redirect command and begins to send client requests to the new server.

19 Claims, 8 Drawing Sheets

Related U.S. Application Data continuation of application No. 11/180,072, filed on Jul. 13, 2005, now Pat. No. 8,909,782.

(58) Field of Classification Search
USPC .......................................................... 709/203
See application file for complete search history.

(56) References Cited

U.S. PATENT DOCUMENTS

| | | | |
|---|---|---|---|
| 6,560,717 B1 | 5/2003 | Scott et al. | |
| 6,748,414 B1 | 6/2004 | Boumas | |
| 6,779,017 B1 | 8/2004 | Lamberton et al. | |
| 6,865,605 B1 | 3/2005 | Soderberg et al. | |
| 6,886,035 B2 | 4/2005 | Wolff | |
| 7,379,458 B2 | 5/2008 | Inoue et al. | |
| 7,814,210 B1 * | 10/2010 | Mueller | H04L 67/1097 709/227 |
| 2002/0010783 A1 * | 1/2002 | Primak | G06F 9/505 709/228 |
| 2003/0074467 A1 | 4/2003 | Oblak et al. | |
| 2003/0108052 A1 | 6/2003 | Inoue et al. | |
| 2003/0187871 A1 * | 10/2003 | Amano | H04L 67/1002 |
| 2004/0030750 A1 | 2/2004 | Moore et al. | |
| 2005/0038801 A1 | 2/2005 | Colrain et al. | |
| 2005/0086342 A1 | 4/2005 | Burt et al. | |

OTHER PUBLICATIONS

"Enhydra Director", at director.objectweb.org/doc/6.3/director/director.html.

Rosenberg et al., "Maximizing performance, Availability and Security of BEA WebLogic Clusters", wldj, at htt;:wldj.sys-con/read/42823.htm, 2005.

Ying-Dar Lin et al., "Direct Web Switch Routing with State Migration, TCP Masquerade, and Cookie Name Re-writing," Globecome 2003, IEEE Global Telecommunications Conference. Conference Proceedings San Francisco, Dec. 1-5, 2003, pp. 3663-3667.

Ruest et al., "Open 24 Hours: Load Balancing", Redmondmag.com at http://redmondmag.com/features/article.asp? EditorialsID=474, Apr. 2005.

"Big-IP Enterprise Controller", F5 Networks, at http://www.icann.org/tlds/org/applications/register/attachments/hardware/netvvork/Color-Big IP .pdf.

EP Examination Report; 06 763 782.7; Filed Dec. 2, 2013.

\* cited by examiner

METHOD AND SYSTEM FOR DYNAMICALLY REBALANCING CLIENT SESSIONS WITHIN A CLUSTER OF SERVERS CONNECTED TO A NETWORK

FIELD OF INVENTION

The present invention deals generally with maintaining server affinity while load balancing requests to a server cluster. In particular, the present invention rebalances sessions across a server cluster having multiple routers without coordinating the multiple routers and while accounting for configuration changes in the server cluster.

BACKGROUND OF THE INVENTION

A service provider responding to client requests from a number of web based applications needs more than one server. The service provider distributes tasks requested by clients to applications across an array of individual servers, called server clusters. Clients make requests to applications running on the individual servers in the server cluster through a web browser in order to receive results from the applications. The sending of requests, and the receiving of results take place in a series of Hypertext Transfer Protocol (HTTP) communications between the client and the server, called sessions. Examples of a session include selecting and purchasing goods from an online retailer or performing a series of banking transactions.

The provider of the server cluster maintains HTTP session state by employing a mechanism so that individual HTTP clients are sent to the same server across multiple requests in a session. When a specific server is assigned to a specific client, the relationship between the server and the client is called affinity, and the assigned server is called an affinity server.

As additional clients access the server cluster, new sessions will be created between the clients and assigned servers. If too many sessions are assigned to a single server, the server may become overloaded causing a range of performance problems including system failure. Therefore, new sessions will be distributed to different servers across the server cluster to balance the server load within the server cluster. The distribution of sessions across the different servers on a cluster is called load balancing.

Load balancing across multiple servers is known. Oliver Matsutti, in "Distributed Web Session Management," (Master's Thesis, 2000) discloses using an HTTP Redirect command for assignment of a client's request to a different server from that to which the request was directed. Matsutti's software resides on the web server, and the decision to redirect the request is made at the web server which functions as a router to select the destination application server.

When redirection is initiated at the router level, a problem arises when multiple routers are employed. In a live, distributed system, each individual router instance must pick the same alternative destination. In other words, different routers must have the same data at a given instance. Timing issues may occur in transferring the state information necessary for multiple routers to distribute multiple requests for a given session to the same newly selected server. A commonly known solution to address such timing issues is a distributed locking mechanism.

Specifically, the distributed locking mechanism coordinates the state information in each router so that each router makes the same decision as to where to send a request. But the distributed locking mechanism requires extensive code to be written to coordinate the actions of the routers.

In addition to the problem of coordinating the routers, servers may be added to or deleted from the server cluster, new applications may be installed on an existing server in the cluster, or the weight given a particular server for load balancing may be changed. Therefore, another problem that arises when rebalancing among individual servers in a cluster is to account for changes in the server cluster configuration.

Therefore, a need exists for a mechanism to rebalance sessions across individual severs in a cluster without the need to write code to coordinate multiple routers and to account for changes in the configuration of the server cluster.

SUMMARY OF THE INVENTION

The system which meets the needs identified above is a dynamic rebalancer that operates in the server cluster. The DR operates independently of the routers so that no coordination is required between the multiple routers. In a system comprising a server cluster containing a plurality of application servers and a plurality of clients connected to the server cluster and to a plurality of routers, a dynamic rebalancer ("DR") moves sessions without requiring coordinating code for the routers. The DR has a configuration component (CC), a statistic component (SC), a manager component (MC), an analysis component (AC), and a filter component (FC), each of which work together to accomplish load balancing within the server cluster.

The CC monitors each of the servers in the cluster and transmits configuration information so that each of the servers in the cluster receives real time information regarding the configuration of each of the servers in the cluster. Configuration information includes whether a server is on line or off line, which applications are installed on each server, and the proportional "weight" assigned to each server. The SC registers and receives real time statistical information for each of the servers in the cluster including the number of HTTP sessions in memory on each server.

The MC collects the configuration information from the CC and the statistics information from the SC and sends this information to the AC. In addition, the MC ensures that the session information, for a session that is to be moved, is retrievable by other servers in the server cluster, and notifies the FC when it is safe to move the session.

The AC uses the configuration information and the statistics information to determine which session, if any, should be moved. The AC may determine which session should be moved in two ways. First, responding to a filter request from the FC, the AC may perform an analysis to determine whether a session should be moved. Second, the AC may send instructions to move a session when a configuration change is detected and the AC selects sessions for transfer to a new server.

The FC operates in two ways (corresponding to the two AC operations discussed above). First the FC intercepts all client requests to a server. The FC may send a filter request to the AC for a determination as to whether a session should be transferred. If a determination is made that a session should be transferred, the AC sends transfer instructions to the FC. Second, the FC receives transfer instructions from the AC when the AC makes a determination in response to a configuration change.

When the FC receives transfer instructions from the AC, the FC adds a cookie to the client request and sends the request to the new server. The cookie contains a redirect command instructing the client to send subsequent requests in the session to the new server. The FC continually redirects client requests within the session to the new server until the client receives the redirect command and begins to send client requests to the new server.

With the DR, all the steps to cause the redirection occur on the server, without involving the routers. The DR runs on the cluster, and therefore, it has real-time knowledge of the cluster state.

An alternate embodiment of the DR uses a router plug-in which intercepts the send redirect command for the duration of an active session rather than passing the send redirect command or a new cookie to the client.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 8 is a flowchart of the logic of the alternative embodiment employing a router plug-in.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Dynamic Rebalancer (DR)."

Figure 1:
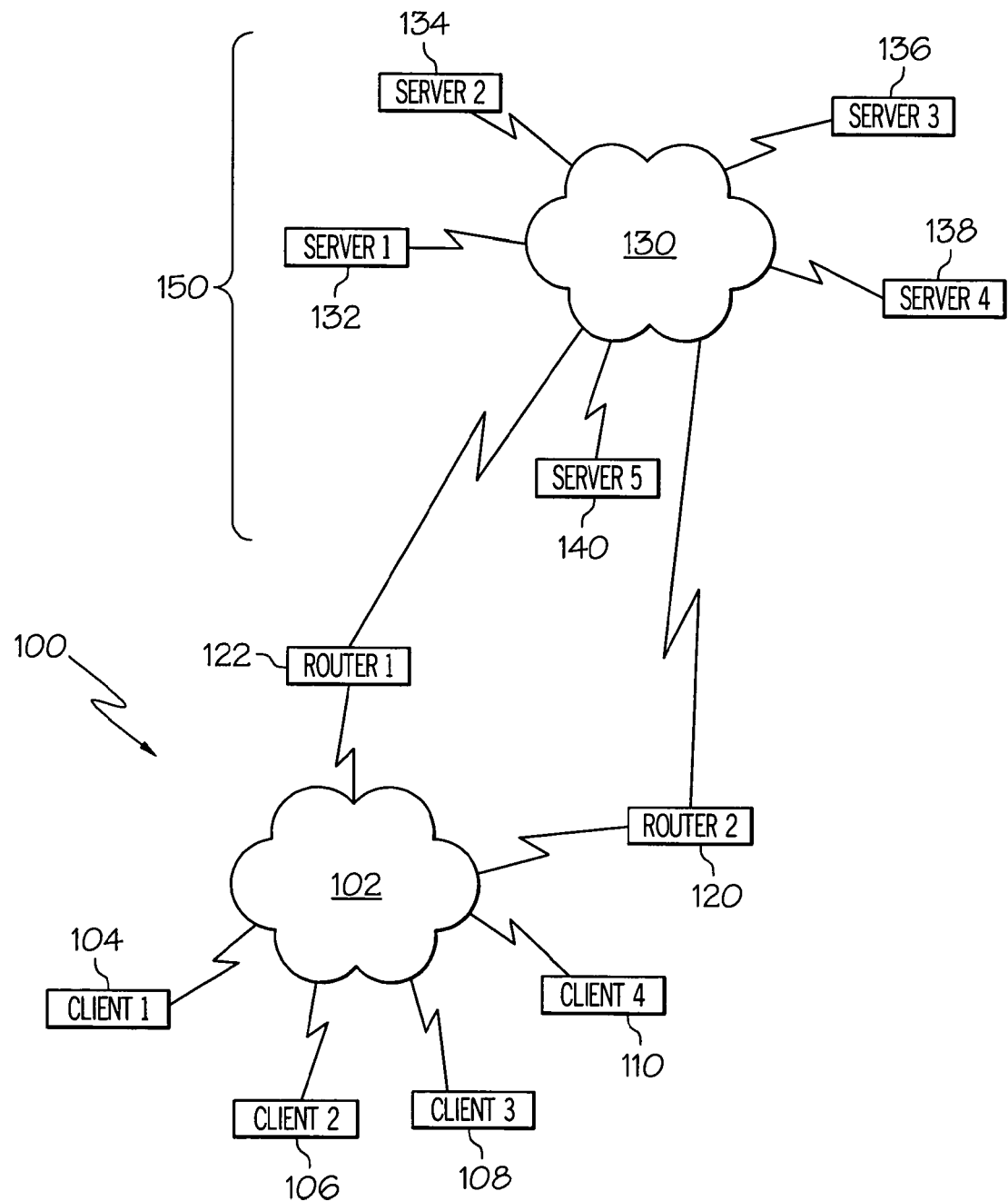
FIG. 1 describes a network with a cluster of servers, multiple routers and multiple clients.

Additionally, the DR is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including client computer 1 104, client computer 2 106, client computer 3 108, client computer 4 110, router 1 122, router 2 120, server 1 132, server 2 134, server 3 136, server 4 138, and server 5 140. First network connection 102 comprises all hardware, software, and communications media necessary to enable communication between network nodes 104-122. Second network connection 130 comprises all hardware, software, and communications media necessary to enable communication between network nodes 132-140. Cluster 150 comprises second network connection 130, server 1 132, server 2 134, server 3 136, server 4 138, and server 5 140. Unless otherwise indicated in context below, all network nodes use publicly available protocols or messaging services to communicate with each other through first network connection 102 and second network connection 130.

Figure 2A:
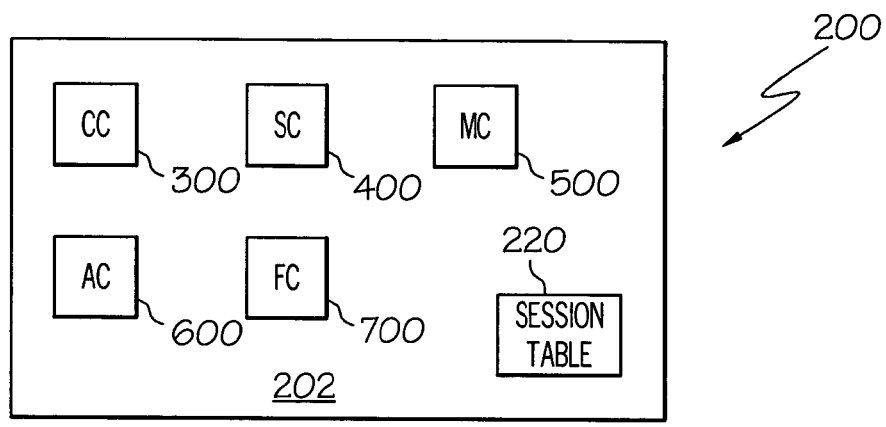
FIG. 2A depicts a storage configuration containing the dynamic rebalancer components.
Figure 2B:
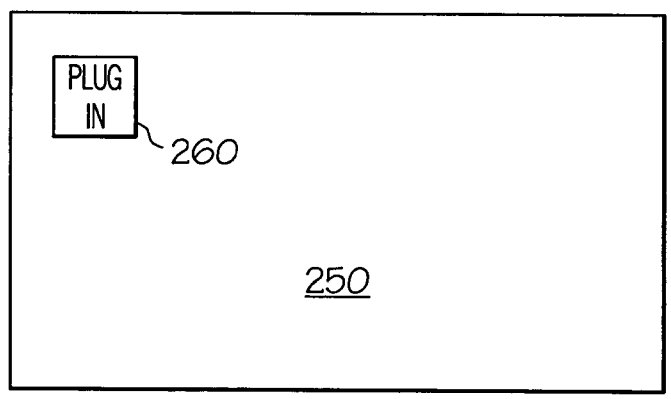
FIG. 2B depicts a router storage configuration containing the alternate embodiment router plug in component.

Dynamic Rebalancer (DR) 200 typically is located in a storage, represented schematically as storage 202 in FIG. 2A. The term "storage," as used herein, includes without limitation any volatile or persistent medium, such as an electrical circuit, magnetic disk, or optical disk, in which a computer can store data or software for any duration. A single storage may encompass and be distributed across a plurality of media. Thus, FIG. 2A is included merely as a descriptive expedient and does not necessarily reflect any particular physical embodiment of storage 202. Storage 202 resides within each of the servers of server cluster 150, or may be distributed within server cluster 150. FIG. 2B depicts router storage 250 with plug in 260 residing therein. Router storage 250 may be connected to each of the routers in network 100, or may reside within each of the routers of network 100. As used herein, router means any software, hardware, or combination of software and hardware that functions to distribute client requests to the servers in a server cluster.

DR 200 has configuration component (CC) 300, statistic component (SC) 400, manager component (MC) 500, analysis component (AC) 600, and filter component (FC) 700, each of which work together to accomplish session load balancing within a server cluster such as server cluster 150. In addition, DR 200 accesses session table 220.

Figure 3:
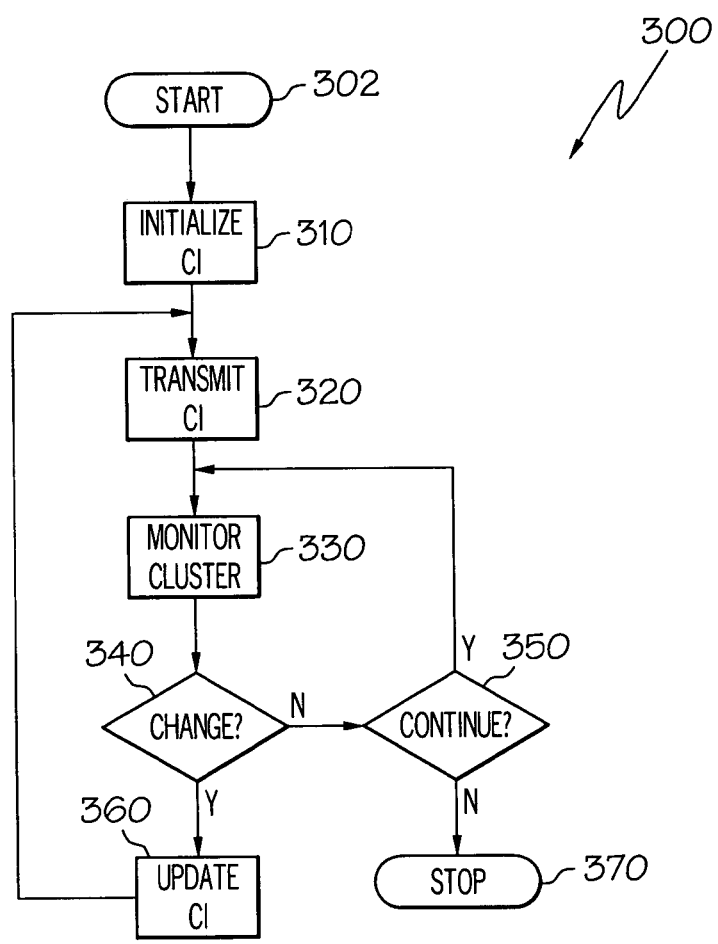
FIG. 3 is a flowchart describing the logic of the configuration component.

CC 300 monitors each of the servers in the cluster and transmits in real time configuration information so that each of the servers in the cluster receives real time information regarding the configuration of each of the servers in the cluster. Configuration information includes data indicating whether a server is on line or off line, which applications are installed on each server, and the proportional "weight" assigned to each server. Referring to FIG. 3, CC 300 starts 302, initializes configuration information 310, and transmits the configuration information to each of the other servers in the cluster (320). CC 300 monitors the cluster 330 and determines whether there has been a change in the configuration of the cluster (340). If CC 300 detects a change in the configuration information, it updates the configuration information (360) and goes to step 320. If CC 300 detects no change, CC 300 determines whether to continue (350). If so, CC 300 goes to step 330 and if not, CC 300 stops (370).

Figure 4:
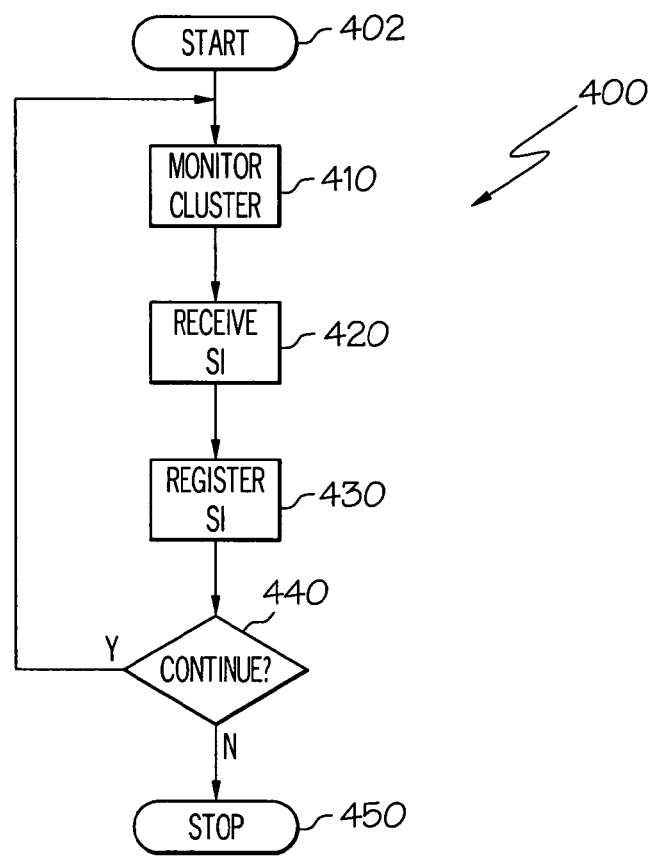
FIG. 4 is a flowchart describing the logic of the statistics component.

SC 400 receives and registers real time statistical information for each of the servers in the cluster including the number of HTTP sessions in memory on each server. Referring to FIG. 4, SC 400 starts (402) and monitors the server cluster (410). SC 400 receives statistics information from the servers on the server cluster (420) and registers the statistics information so that it can be accessed by MC 500 (see FIG. 5) (430). SC 400 determines whether to continue (440), and if so, goes to step 410. If not, SC 400 stops (450).

Figure 5:
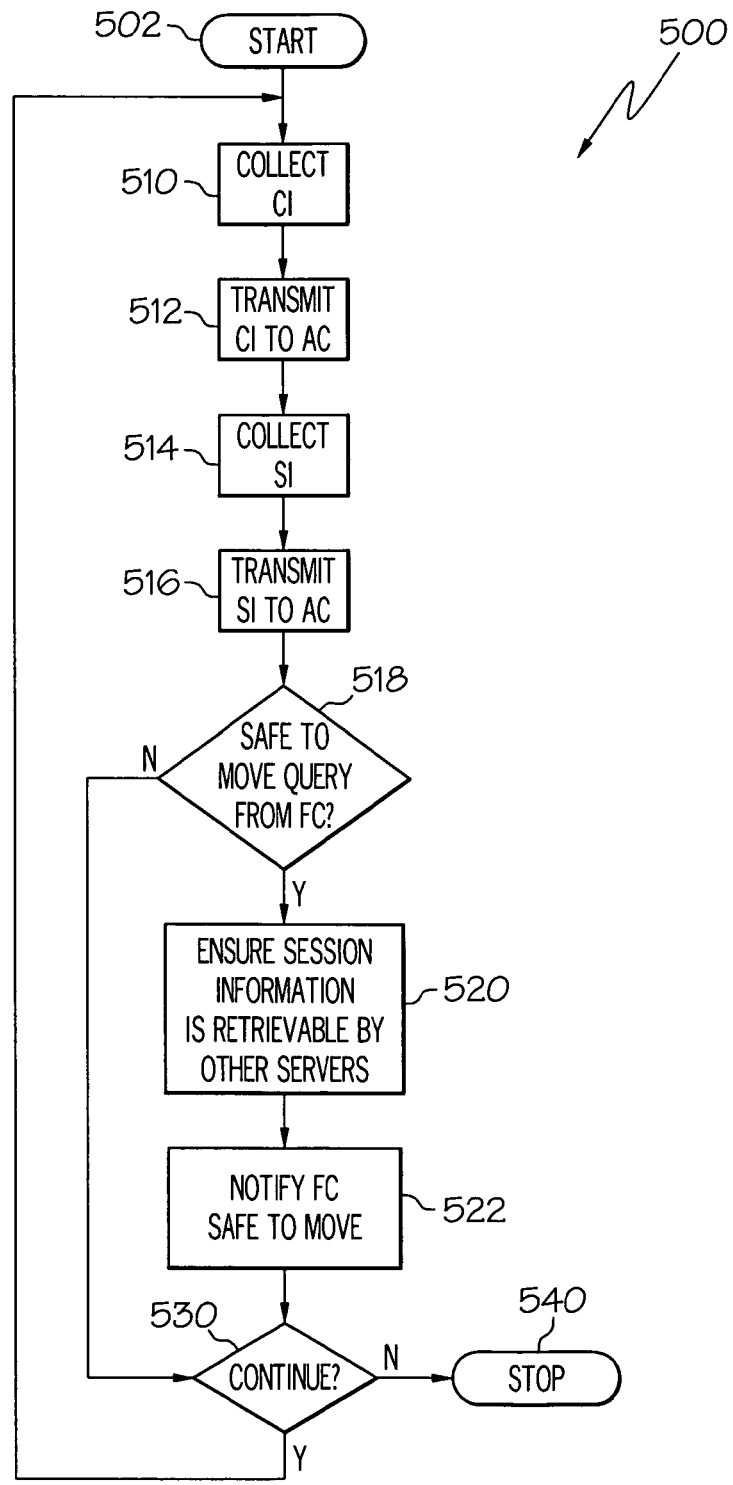
FIG. 5 is a flowchart describing the logic of the manager component.
Figure 6:
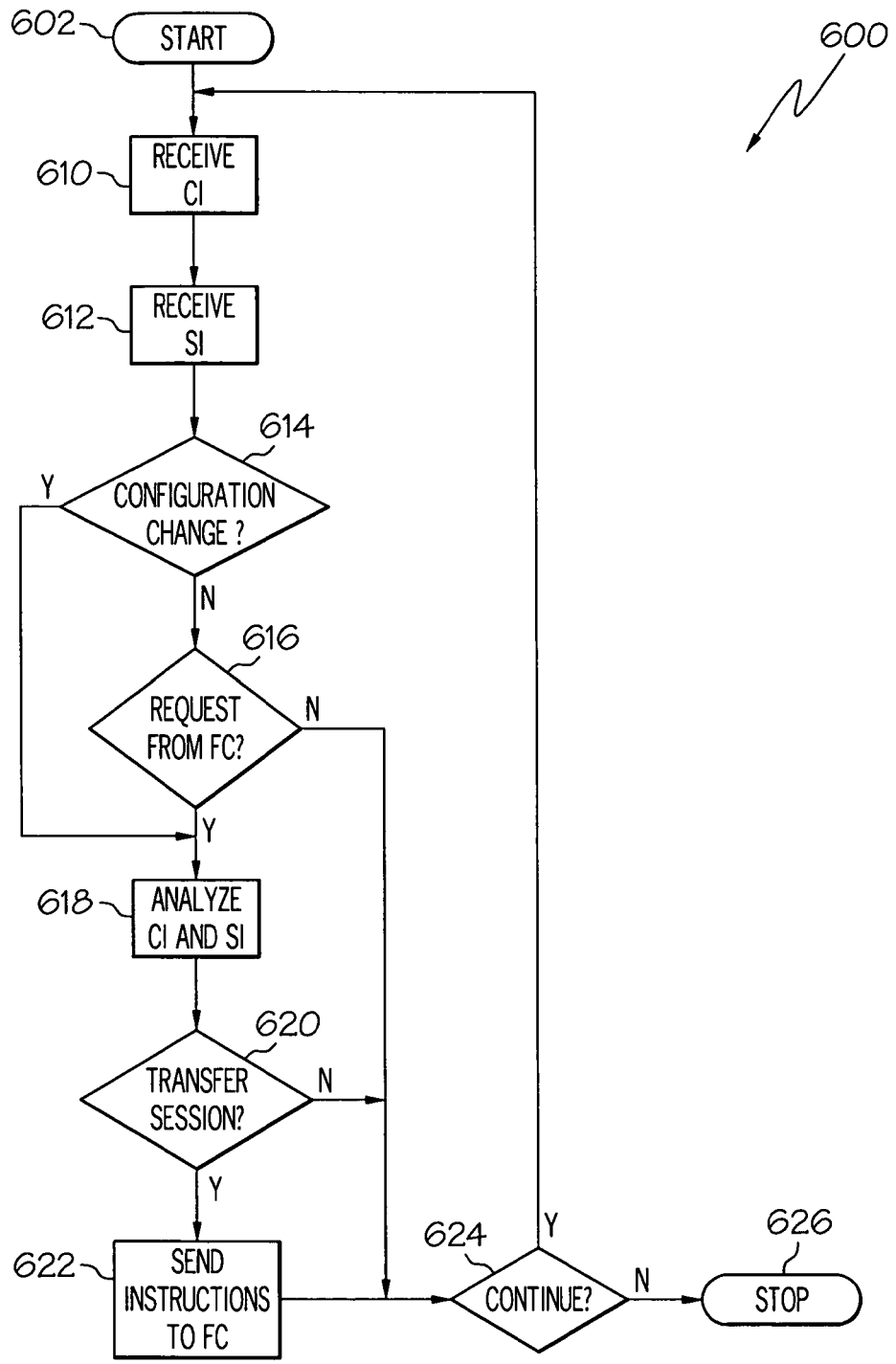
FIG. 6 is a flowchart of the logic of the analysis component.
Figure 7:
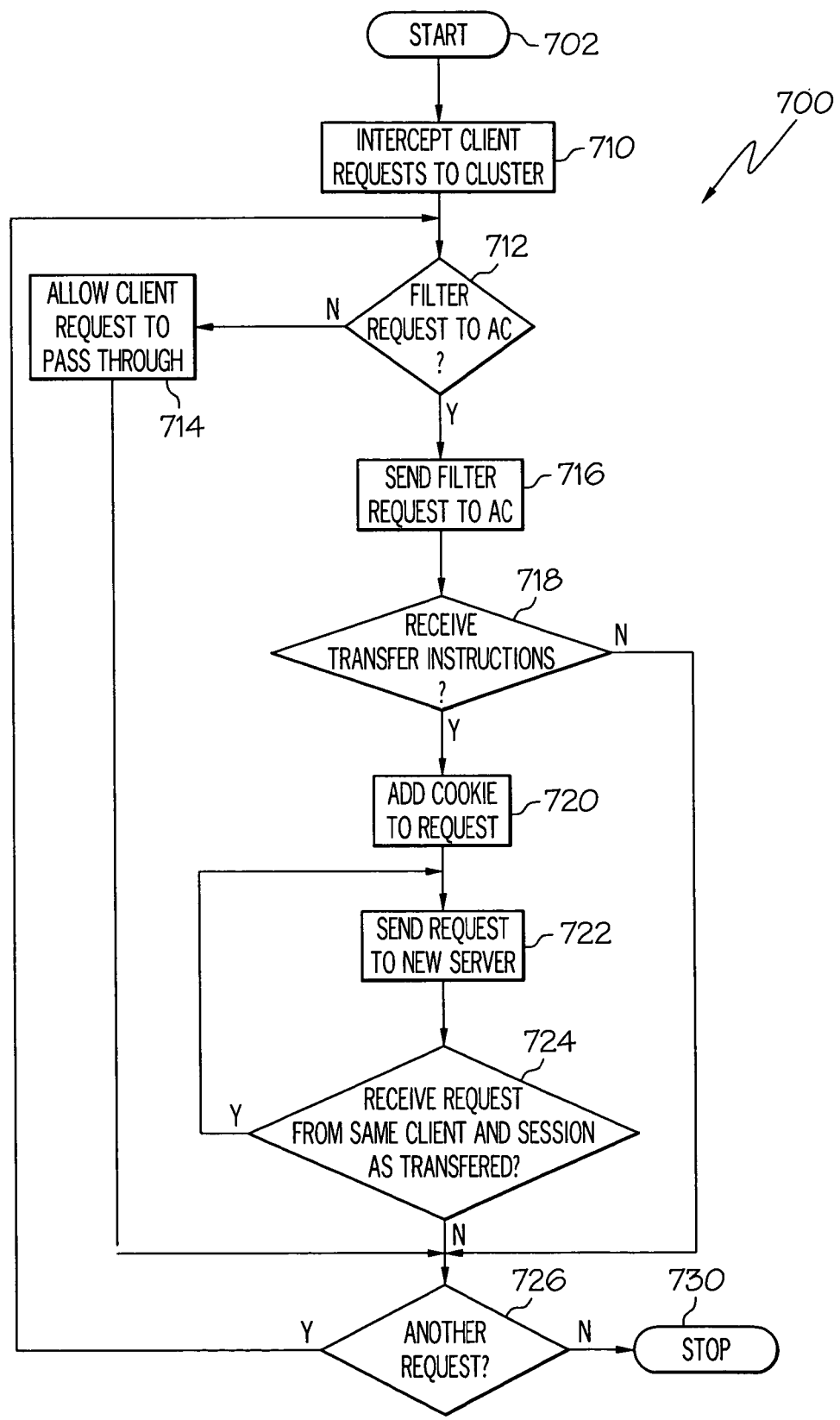
FIG. 7 is a flowchart of the logic of the filter component.

MC 500 collects the configuration information from CC 300 and the statistics information from the SC 400 and sends this information to AC 600 (see FIG. 6). Referring to FIG. 5, MC 500 starts (502), collects configuration information from CC 300 (510) and transmits the configuration information to AC 600 (512). MC 500 collects statistics information from SI 400 (514) and transmits the statistics information to AC 600 (516). MC 500 determines whether a query has been received from FC 700 as to whether it is safe to move a session (518). If MC 500 received such a query, MC 500 ensures that the session information for the session to be moved is retrievable by other servers in the server cluster (520), and then notifies FC 700 that it is safe to move the session (522). MC 500 determines whether to continue (540) and if so goes to step 510 or if not, stops (550).

AC 600 uses the configuration information and the statistics information to determine which session, if any, should be moved. AC 600 starts (602), receives configuration information from CC 300 (610), and receives statistics information from SC 400 (612). AC 600 determines whether a configuration change has been made to the server cluster (614). A configuration change may include, without limitation, a new server being added, a new application being installed on one of the servers in the cluster, or a change in the weight accorded to a server for load balancing purposes. If a configuration change is detected, AC 600 goes to step 618. If not, AC 600 determines whether a request from FC 700 has been received (616). If so, AC 600 analyzes the configuration information and the statistics information (618) and determines whether to transfer the session (620). If a determination is made to transfer the session, AC 600 sends instructions for the transfer to FC 700 and goes to step 624. If at step 616, or at step 618, AC 600 makes a negative determination, it goes to step 624. At step 624, AC 600 makes a determination whether to continue, and if so, goes to step 610 or if not, stops (626).

FC 700 starts (702) and intercepts client requests to the server cluster (710). FC 700 determines whether to send a filter request to AC 600, and if such a determination is made, sends a filter request to AC 600 (712). If not, FC 700 allows the client request to pass through to the server cluster (714) and goes to step 726. FC 700 will allow requests that are within ongoing active sessions to pass through, and filter requests will be sent for new sessions. However, there are additional ways in which FC 700 may be configured. For example, it may determine that the application to which the client request is directed is operating within acceptable limits, or that the application is excluded from load balancing requirements. Thus, if the session does not need to be analyzed, the filter allows the requests to pass through to the web application and, correspondingly, results to pass to the client. FC 700 determines whether it has received transfer instructions from AC 600 (718). If so, FC 700 adds a cookie to the corresponding client request (720) and sends the request to the new server (722). The cookie contains a redirect command instructing the client to send subsequent requests in the session to the new server. FC 700 determines whether a request has been received from the same client and session as the one for which a transfer was effected (724), and if so, goes to step 722 and sends the request to the new server. If not, FC 700 determines whether another request has been received (726), and if so, goes to step 712 or if not, stops (730). Through step 724, FC 700 continually redirects client requests within the session to the new server until the client receives the redirect command and begins to send requests to the new server.

Figure 8:
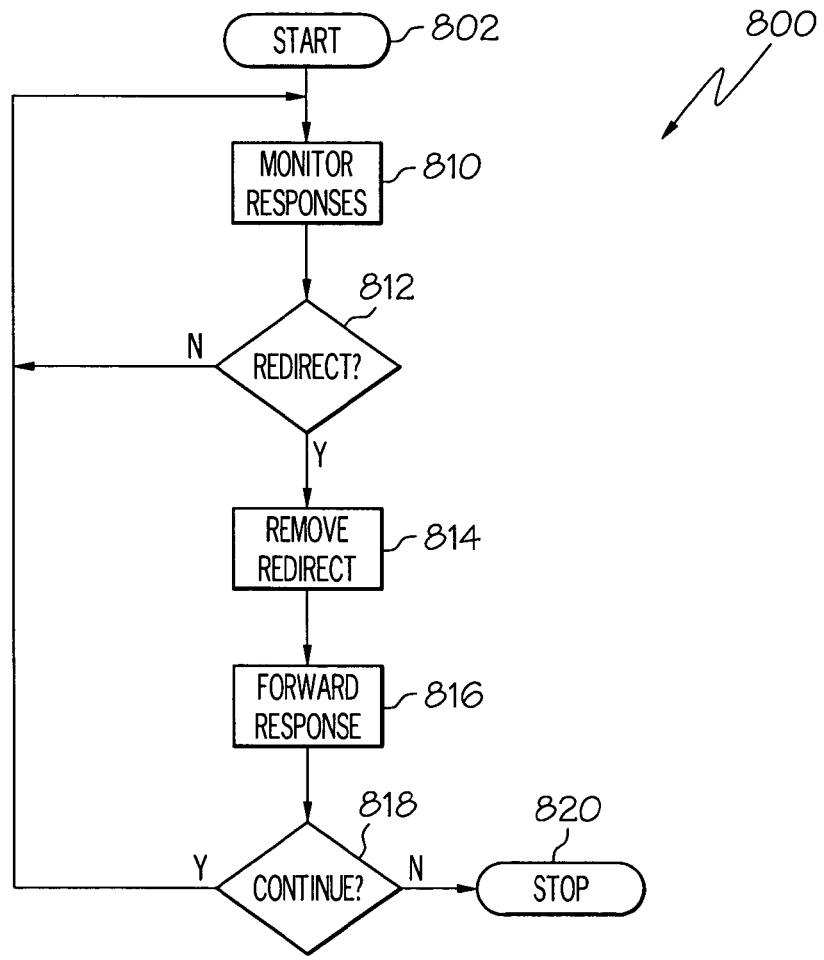

In an alternate embodiment, Router Plug-In Component (PI) 800 performs some of the functions of FC 700 at the router. Specifically, PI 800 avoids transmitting the cookie with the send redirect command to the client. Referring to FIG. 8, PI 800 starts (802) and monitors responses from the server cluster (810). When PI 800 determines that a redirect command has been added to the response (812) it removes the redirect command (814) and forwards the response (816). If PI 800 does not determine that a redirect command had been added, PI 800 goes to step 810. PI 800 determines whether to continue (818), and if so goes to step 810 or if not stops (820).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented method comprising:
a configuration component configured to monitor each of a plurality of servers in a server cluster and transmit real time information corresponding to a configuration of each of the plurality of servers, the real time information comprising at least data of which applications are installed on each of the plurality of servers, whether the applications are excluded from load balancing requirements, and a change in a weight accorded to a server of the plurality of servers for the load balancing requirements;
using a filter program residing in a storage in each of the plurality of servers connected in the server cluster;
the filter program intercepting a client request in a session from a client computer directed to a first server of the plurality of servers in the server cluster, wherein one router of a plurality of routers distributes the client request to the first server in the server cluster during the session;
the filter program allowing the client request to pass through to a web application in response to a determination that that an application of the applications is excluded from the load balancing requirements;
the filter program sending a filter request to an analysis program determines whether a configuration change is detected based on the real time information in response to the determination that the applications are not excluded from the load balancing requirements; and
responsive to receiving instructions from the analysis program that the configuration change is detected including the change to the weight accorded to the server of the plurality of servers for the load balancing requirement, the filter program adding a cookie to the client request after establishing the session, and sending the client request, including the cookie, to a second server of the plurality of servers in the server cluster that is chosen by the analysis program, wherein the filter program executes in the first server and continually redirects each subsequent client request within the session to the second server until the client computer, responsive to receiving a redirect command in the cookie, begins to send the client request in the session to the second server, and the cookie includes the redirect command to each subsequent client request within the session to the second server.

2. The computer implemented method of claim 1, further comprising:
receiving configuration information;
receiving statistics information; and
using a manager program, collecting the configuration information and the statistics information, and sending the configuration information and the statistics information to the analysis program.

3. The computer implemented method of claim 2, wherein the manager program further comprises:
ensuring that a session information, for a session that is to be moved, is retrievable by the plurality of servers in the server cluster.

4. The computer implemented method of claim 1, wherein the analysis program uses configuration information of the server cluster to determine whether to send the instructions to transfer a session to the filter program.

5. The computer implemented method of claim 1, further comprising:
a statistics component monitoring the server cluster, and receiving and registering statistic information.

6. The computer implemented method of claim 1, further comprising a statistics component that monitors the server cluster, receives and registers information including a number of HTTP sessions in memory on each server of the server cluster.

7. The computer implemented method of claim 6, wherein the at least data of the real time information further comprises whether the applications are operating within a predetermined limit.

8. A server cluster, comprising:
a plurality of servers in the server cluster that are connected to a plurality of client computers by a plurality of routers and the Internet, the client computers establish a session with the at least one of the servers in the server cluster and send client requests upon establishing the session, the routers distribute client requests to servers in the server cluster during the session;
a configuration component configured to monitor each of the servers in the server cluster and transmit real time information corresponding to a configuration of each of the servers, the real time information comprising at least data of which applications are installed on each of the servers, whether the applications are excluded from load balancing requirements, whether the applications are operating within a predetermined limit, and a change in a weight accorded to a server of the plurality of servers for the load balancing requirements;
a filter program residing in a storage in each of the servers of the server cluster and being executed by each respective server;
the filter program allows the client request to pass through to a web application in response to a determination that that an application of the applications is excluded from the load balancing requirements;

the filter program, responsive to intercepting a client request from a client computer to a first server in the server cluster during a session, sends a filter request to an analysis component determines whether a configuration change is detected based on the real time information_in response to the determination that the applications are not excluded from the load balancing requirements, and responsive to receiving instructions to transfer the session based on the configuration change being detected to a second server including the change to the weight accorded to the server of the plurality of servers for the load balancing requirement, adds a cookie to the client request and forwards the client request to the second server after the session is established; and the analysis component uses configuration information and a statistic information to determine whether to transfer the session from the first server to the second server in order to achieve a rebalance of a workload within the server cluster, wherein the filter program executes in the first server and continually redirects each subsequent client request within the session to the second server until the client computer, responsive to receiving a redirect command in the cookie from the filter program, begins to send the client request in the session to the second server, each of the servers comprise a hardware storage circuit which is configured as a dynamic rebalance, the configuration component is further configured to update the real time information in response to a determination that there has been the configuration change in the server cluster, and the cookie includes the redirect command to each subsequent client request within the session to the second server.

9. The server cluster of claim 8, further comprising:
a statistics component that monitors the server cluster, receives and registers statistic information.

10. The server cluster of claim 8, further comprising:
a manager component that collects configuration information and statistic information and transmits the configuration information and the statistic information to the analysis component.

11. The server cluster of claim 10, wherein the manager component further comprises:
ensuring that a session information, for a session that is to be moved, is retrievable by the plurality of servers in the server cluster.

12. A server arrangement, comprising:
a server cluster, comprised of a plurality of servers, connected to a plurality of client computers by a plurality of routers and the Internet, a client computer of the plurality of client computers establishes a session with one of the servers in the server cluster and sends client requests upon establishing the session, the routers distribute client requests to servers in the server cluster during the session;
a configuration component configured to monitor each of the servers in the server cluster and transmit real time information corresponding to a configuration of each of the servers, the real time information comprising at least data of which applications are installed on each of the servers, whether the applications are excluded from load balancing requirements, and a change in a weight accorded to a server of the servers for the load balancing requirements;

a filter program residing in a storage in each of the servers of the server cluster that is executed by each of the servers;

the filter program allows the client request to pass through to a web application in response to a determination that that an application of the applications is excluded from the load balancing requirements; and the filter program for each server, responsive receiving instructions to transfer a session based on a configuration change detected including the change to the weight accorded to the server of the servers for the load balancing requirement based on the real time information in response to the determination that the applications are not excluded from the load balancing requirements from a first server executing the filter program to a second server in order to achieve a rebalance of a workload within the server cluster, adds a cookie to the client request and forwards the client request to the second server, wherein the filter program executes in the first server and continually redirects each subsequent client request within the session to the second server until the client computer, responsive to receiving a redirect command in the cookie, begins to send the client request in the session to the second server, and the session is moved from the first server to the second server to achieve the rebalance of the workload independently of the plurality of routers, the configuration change comprises a new application being installed on at least one of the servers and the change in the weight accorded to the server of the server for the load balancing requirement, and the cookie includes the redirect command to each subsequent client request within the session to the second server.

13. The server arrangement of claim 12, wherein an analysis program uses configuration information in determining to send instructions to transfer a session to the filter program.

14. The server arrangement of claim 12, further comprising:
a statistics component that monitors the server cluster, receives and registers statistic information.

15. The server arrangement of claim 12, further comprising:
a manager component that collects configuration information and statistic information and transmits the configuration information and the statistic information to an analysis component.

16. The server arrangement of claim 15, wherein the manager component further comprises:
ensuring that a session information, for a session that is to be moved, is retrievable by the plurality of servers in the server cluster.

17. The computer implemented method of claim 1, further comprising a manager component which determines whether it is safe to move the session from the first server to the second server, and notifies the filter program to move the session from the first server to the second server to achieve the rebalance of the workload independently of the plurality of routers in response to determining that it is safe to move the session from the first server to the second server.

18. The computer implemented method of claim 17, wherein the filter program moves the session from the first server to the second server to achieve the rebalance of the workload independently of the plurality of routers in response to being notified by the manager component, and the cookie contains a redirect command.

19. The computer implemented method of claim 18, wherein the redirect command includes instructions for the client computer to send subsequent requests in the session to the second server.

* * * * *